United States Patent [19]
Youngman

[11] 3,883,312
[45] May 13, 1975

[54] MOVING-BED REACTOR WITH WITHDRAWAL OF CATALYST AND EFFLUENT THROUGH THE SAME CONDUIT

[75] Inventor: Gary A. Youngman, Buffalo Grove, Ill.

[73] Assignee: Universal Oil Products Company, Des Plaines, Ill.

[22] Filed: Nov. 8, 1973

[21] Appl. No.: 414,036

[52] U.S. Cl............ 23/288 G; 23/288 E; 208/143; 208/157; 208/173; 210/189; 252/414; 134/25 R
[51] Int. Cl............................................. B01j 9/12
[58] Field of Search....... 23/288 G, 288 E; 208/143, 208/157, 173; 210/189, 414; 252/416, 418; 134/25 R

[56] References Cited
UNITED STATES PATENTS

| | | | |
|---|---|---|---|
| 2,159,140 | 5/1939 | Eckell et al. | 23/288 E X |
| 3,051,314 | 8/1962 | Conn | 210/189 |
| 3,072,567 | 1/1963 | Evans et al. | 134/25 R X |

*Primary Examiner*—James H. Tayman, Jr.
*Attorney, Agent, or Firm*—James R. Hoatson, Jr.; Robert W. Erickson; William H. Page, II

[57] ABSTRACT

Both the used solid catalyst and the reactor effluent are removed from a moving-bed reactor through the same withdrawal conduit. The reactor effluent exits the conduit through perforations in its wall. The catalyst descends past the perforations and is washed by an upward moving wash oil which leaves through the same perforations.

3 Claims, 1 Drawing Figure

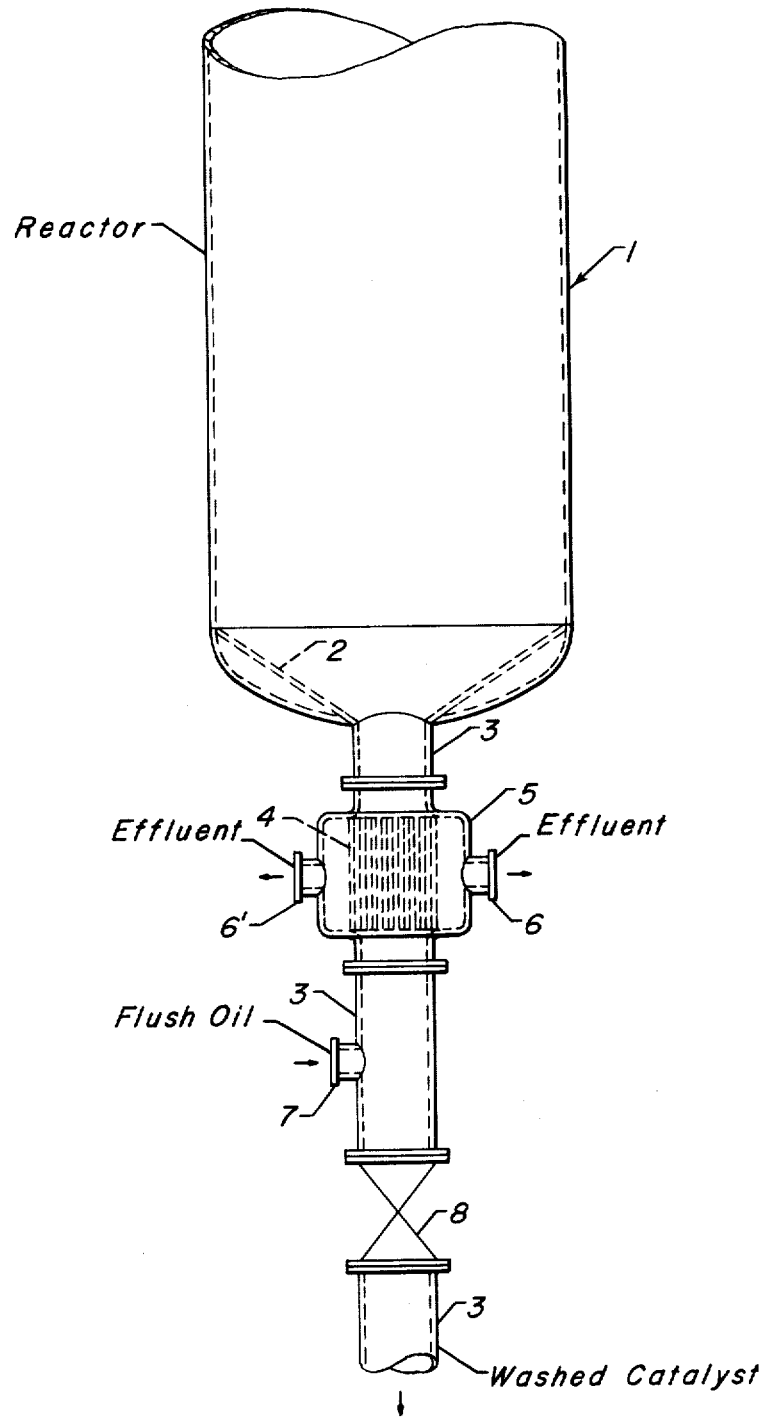

3,883,312

MOVING-BED REACTOR WITH WITHDRAWAL OF CATALYST AND EFFLUENT THROUGH THE SAME CONDUIT

BACKGROUND OF THE INVENTION

1. Field of the Invention

The invention relates to moving-bed reactors used in the conversion of mineral oils. More specifically, the invention relates to a reactor design providing means for removing solid catalyst and an effluent stream from the bottom of a moving-bed reactor used in the hydrotreating of mineral oils and the separation of these materials.

2. Description of the Prior Art

The conversion of petroleum derived material by their passage with hydrogen over solid catalyst has reached a high level of expertise. The unsolvable problems of eventual catalyst deactivation and the advantages of continuous processing have been realized as is demonstrated by U.S. Pat. No. 2,303,717. This reference teaches the conversion of a gas oil in a plug-flow moving-bed reactor and the regeneration of the catalyst in an annular moving-bed regenerator. Other basic components of moving systems such as lock hoppers and catalyst stripping zones are also presented. U.S. Pat. No. 3,730,880 presents another example of moving-bed reactors used for desulfurization of residual oils.

Because of the extreme pressures now used in the hydroprocessing of heavy oils, the contemporary emphasis in the actual usage of moving reactors has been directed to low pressure, vapor-phase processes such as reforming. An example of a moving-bed reforming reactor is found in U.S. Pat. No. 3,647,680 and an example of transalkylation and isomerization of methyl benzenes in a moving-bed reactor is provided by U.S. Pat. No. 3,211,798. In U.S. Pat. No. 3,361,838, there is taught the beneficial use of the selective absorbent properties of a solid catalyst support to remove a product from a reaction zone. One product leaves the reaction zone absorbed on the catalyst in this process. However, this reference does not suggest the withdrawal of the total reaction zone effluent with the catalyst and does not contribute to the art of catalyst withdrawal or present any specific apparatus for separating catalyst from the reactor effluent and subsequently washing the catalyst.

BRIEF SUMMARY OF THE INVENTION

The invention resides in a new moving-bed reaction zone apparatus which allows the withdrawal of both catalyst and reaction zone effluent through the same conduit and the convenient washing of the catalyst while in that conduit. The invention comprises a vertically disposed reaction vessel having catalyst and reactant inlets on its upper portion, and a combined catalyst and reactor effluent outlet conduit extending downward from a bottom portion of the vessel and containing a perforated section in the wall of the conduit which allows the reactor effluent and wash oil to exit from the conduit and the washed catalyst to move downward past the perforated section for removal.

DESCRIPTION OF THE DRAWING

The drawing depicts the lower section of a vertically disposed outer vessel 1 used as a moving-bed reactor. Near the bottom of the vessel, a cone-shaped catalyst support 2 directs downward flowing catalyst to the center of the reactor. A combined catalyst and reactor effluent outlet conduit 3 is attached to the bottom of the vessel at this point. This conduit is normally full of catalyst when the reactor is in use. The reactor effluent passes over this catalyst down to a cylindrical perforated section 4 in the wall of the conduit 3 and then passes through the perforated section into an annular outer casing 5. The reactor effluent then leaves through effluent transfer conduits 6 and 6'. The combined catalyst and reactor effluent outlet conduit 3 extends downward past the perforated section. A wash oil inlet conduit 7 joins the withdrawal conduit for the admission of a wash oil which enters at this point, passes upward and then exits through the perforated section. A valve 8 is located below the wash oil inlet to control the downward flow of catalyst.

DETAILED DESCRIPTION

As the demand for refined petroleum products expands, it becomes increasingly necessary to process high sulfur and high metal content residual oils, such as those imported from South America. Deposition of vanadium and nickel contained within these oils upon the active sites of a catalyst results in the permanent deactivation of the catalyst. This is in contrast to the deactivation of a catalyst by carbon deposits which may be removed by the in situ burning of the carbon in a standard regeneration process. Still, even these carbon burn-off regeneration steps are costly in that they require the cessation of normal processing activities. Therefore, the use of a moving-bed reactor in the desulfurization or demetallization of these residual oils is advantageous in that it provides the benefits of permitting continuous processing since regeneration of the catalyst is not required. A second benefit is the uniform composition of the products produced since it is not necessary to raise reaction zone temperatures to maintain a constant catalyst activity.

A moving-bed reactor is a reactor in which a nonfluidized bed of catalyst moves downward in a plug flow manner by the action of gravity. Used catalyst is intermittently withdrawn from the bottom of the reactor, and regenerated or new catalyst is intermittently added at the top of the reactor. For successful commercial operation, it is necessary to overcome the problems associated with these transfers of hot, and often oil-covered catalyst into and out of the pressurized reactor. Further, the used catalyst must be separated from the reactor effluent and preferably washed free of the heavier oils on the surface of the catalyst and within the void volume between the catalyst particles. This separation is necessary to recover the oil being processed, to reduce the amount of oil burned in the subsequent regeneration steps and therefore the temperatures reached, and to reduce the safety hazards involved in the handling of hot oil coated catalyst.

It is therefore an object of my invention to provide an apparatus for the facile withdrawal of catalyst from a moving-bed reactor. It is a further object to provide an apparatus for the withdrawal, separation and washing of catalyst used in a high pressure moving-bed reactor used to desulfurize residual oils.

In accordance with these objectives, my invention provides an apparatus for withdrawing both the used catalyst and the reactor effluent through the same conduits. This is in contrast to the prior art's use of separate conduits for these materials. There is also provided a means to conveniently wash the catalyst without the use of separate lock hoppers or valves between the reactor and the washing zone. My invention also provides a convenient method of separating the catalyst from the effluent stream prior to washing the catalyst.

Both the catalyst and the effluent material leave the bottom of the reactor via the same conduit. The effluent material is separated by allowing it to flow out of the conduit through a perforated section in the wall of the conduit. The separated catalyst travels downward past the perforated section into a lower section of the withdrawal conduit. The only liquid flow below the perforated section is that of an upward moving wash oil which removes effluent material from the catalyst before it is withdrawn from the apparatus for regeneration or rejection.

The preferred embodiment of my invention is depicted in the drawing. This drawing is intended to quickly impart an understanding of the invention and not to limit the scope of my invention as claimed. The term "combined catalyst and reactor effluent conduit" is intended to describe and encompass the entire conduit labeled 3 in the drawing. It may be comosed composed several sections and may vary in size or shape at different vertical elevations. In general, the conduit may be any means which confines a vertical column of catalyst and communicates with the reactor in a manner which allows the apparatus to function as intended. Among the basic modifications which are readily apparent is the use of a plurality of combined catalyst and reactor effluent outlet conduits. This may in fact be a superior method since the catalyst may then be withdrawn uniformly over the entire horizontal cross-sectional area of the reactor. The single large central outlet conduit depicted in the drawing could tend to promote a cone-like tunneling of the catalyst being withdrawn and the subsequent accumulation of a layer of inactive catalyst near the outer walls of the reactor.

As depicted, the perforated section 4 in the wall of the combined catalyst and reactor effluent outlet conduit is preferably a cylinder of screening formed by closely aligned parallel vertical bars. It is particularly preferred that the vertical bars be wedge-shaped with their broadest side toward the inside of the conduit to provide a self cleaning action. The vertical alignment of the perforations reduces catalyst attrition by its scraping on the walls and also aids catalyst transfer. The perforations must of course be smaller than the catalyst, and the vertical bars will typically provide an opening of less than 1/16 of an inch. The perforated section may start at a higher location than shown in the drawing, and may actually begin at the edge of the outer vessel. Furthermore, the vertical screening used as the perforated section may continue upward into the internal volume of the reactor to form a lip around the effluent outlet. The area outside of the screen could then be filled with inert ceramic balls having a larger diameter than the catalyst. This would reduce the pressure drop encountered when the reactants flow to the outlet and promote a more uniform drainage pattern in the catalyst bed.

The preforated section shown in the drawing is surrounded by a cylindrical outer casing which completely encloses the perforations. The reactor effluent is withdrawn from this enclosed volume through the reactor effluent transfer lines. An alternative method of construction is to utilize the 'straight through' section of a plain tee and to place a perforated screen over the opening on the side of the tee. This simplifies fabrication but may unfavorably limit the available open area provided by the perforations and thereby cause a greater pressure drop. This may be overcome in part by using several tees in series. Screening should also be placed near or over the opening where the wash oil inlet conduit 7 communicates with the catalyst outlet conduit. When a tee is used, the outer casing 5 will consist of the horizontal section past the outlet on the side of the tee.

The wash oil inlet conduit will normally carry an oil lighter than the reactor effluent. If, for instance an atmospheric crude column bottoms material is being processed, then the flush oil can be a light cycle oil. This wash oil may also be a very light material in comparison to the reactor effluent, such as a naphtha, if a very good removal of the effluent material is desired. Since the withdrawal of catalyst will normally be intermittent, the flow of the wash oil can also be intermittent. The flow of wash oil can also be used to regulate the downward movement of catalyst. That is to say, the upward flow of the wash oil may be maintained at a velocity which prevents the downward movement of catalyst. This may be desirable to keep catalyst particles from being in the valve means located below the wash oil inlet when the valve is closed to thereby reduce wear on the face and seat of the valve caused by the crushing of trapped catalyst.

My invention may be described as an apparatus for withdrawing solid catalyst from a moving-bed reactor, which apparatus comprises: (a) a combined catalyst and reactor effluent outlet conduit located on a bottom portion of the moving-bed reactor, the outer wall of said conduit having a perforated section enclosed by an outer casing, and said combined catalyst and reactor effluent conduit extending downward below said perforated section; (b) a reactor effluent transfer conduit communicating with the volume within said outercasing; and, (c) a wash oil inlet conduit communicating with said combined catalyst and reactor effluent outlet conduit at a point below said perforated section, whereby the catalyst and the reactor effluent may be withdrawn from the moving-bed reactor through said combined catalyst and reactor effluent outlet conduit, catalyst may be withdrawn downward past the perforated section and washed by the wash oil entering through said wash oil inlet conduit and passing upward, and the reactor effluent and wash oil may exit through the perforated section.

Normally, a moving-bed reactor will also comprise a vertically disposed cylindrical outer vessel, and a reactant inlet conduit and a catalyst inlet conduit which are located on the upper portion, that is the upper half, of the outer vessel.

I claim:
1. A moving-bed reactor apparatus through which solid catalyst particles forming a catalyst bed descend by the action of gravity, which apparatus comprises:
   a. a vertically disposed cylindrical vessel;
   b. a reactant inlet conduit interconnected with an upper portion of said vessel;
   c. a catalyst inlet conduit interconnected with an upper portion of said vessel;
   d. a combined catalyst and reactor effluent outlet conduit located on a bottom portion of said vessel, said combined catalyst and reactor effluent outlet conduit extending downward and containing a vertically disposed perforated section having openings no larger in size than said catalyst particles, an annular casing surrounding said perforated section forming an annular chamber therebetween, an effluent discharge port disposed in said annular casing and laterally opposite said perforated section, whereby the reactor effluent will pass from the catalyst withdrawal conduit through said perforated section and said discharge port and the catalyst will be separated from the reactor effluent;

e. a wash oil inlet conduit communicating with said combined catalyst and reactor effluent outlet conduit at a point below said perforated section, whereby catalyst and reactor effluent may be withdrawn from the moving-bed reactor through said combined catalyst and reactor effluent outlet conduit, the catalyst being withdrawn downward past the perforated section and washed by said wash oil entering through said wash oil inlet conduit and passing upward, said wash oil being exited through said perforated section and said effluent discharge port with said reactor effluent; and, f. a plurality of inert ceramic balls of a diameter larger than that of said catalyst particles filling said annular chamber to thereby reduce pressure drop due to reactant flow and promote a more uniform drainage pattern in said catalyst bed.

2. The apparatus of claim 1 further characterized in that said perforated section is formed by vertical screening.

3. The apparatus of claim 2 further characterized in that said perforated section is cylindrical in shape.

* * * * *